US011175867B2

(12) United States Patent
Miyata et al.

(10) Patent No.: US 11,175,867 B2
(45) Date of Patent: Nov. 16, 2021

(54) INFORMATION PROCESSING APPARATUS AND COMPUTER READABLE MEDIUM STORING INFORMATION PROCESSING PROGRAM

(71) Applicant: FUJIFILM BUSINESS INNOVATION CORP., Tokyo (JP)

(72) Inventors: Kenji Miyata, Yokohama (JP); Takashi Morimura, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/829,469

(22) Filed: Mar. 25, 2020

(65) Prior Publication Data

US 2021/0181999 A1 Jun. 17, 2021

(30) Foreign Application Priority Data

Dec. 17, 2019 (JP) .............................. JP2019-227671

(51) Int. Cl.
*G06F 3/12* (2006.01)
*G06Q 30/06* (2012.01)
*G06Q 10/06* (2012.01)

(52) U.S. Cl.
CPC .......... *G06F 3/1219* (2013.01); *G06F 3/1205* (2013.01); *G06F 3/1255* (2013.01); *G06Q 10/06315* (2013.01); *G06Q 30/0635* (2013.01); *G06F 3/1287* (2013.01)

(58) Field of Classification Search
CPC .... G06F 3/1219; G06F 3/1205; G06F 3/1255; G06F 3/1287; G06Q 30/0635; G06Q 10/06315
See application file for complete search history.

(56) References Cited

U.S. PATENT DOCUMENTS

2004/0000246 A1* 1/2004 Keane .................... G06Q 40/00
101/483
2020/0142648 A1* 5/2020 Pettersson ............. G06F 40/114

FOREIGN PATENT DOCUMENTS

| JP | 2013-061687 A | 4/2013 |
| JP | 2017-157077 A | 9/2017 |
| WO | 2016/058646 A1 | 4/2016 |

OTHER PUBLICATIONS

Apr. 14, 2021 Office Action issued in Australian Patent Application No. 2020202505.

* cited by examiner

*Primary Examiner* — Iriana Cruz
(74) *Attorney, Agent, or Firm* — Oliff PLC

(57) ABSTRACT

An information processing apparatus includes a processor, and the processor is configured to: accept an order related to production and including objects and a quantity about at least one user; and change the quantity of the accepted order so that, of a resource used for the production of the objects, a portion which cannot be used for the production is not larger than a predetermined standard.

19 Claims, 11 Drawing Sheets

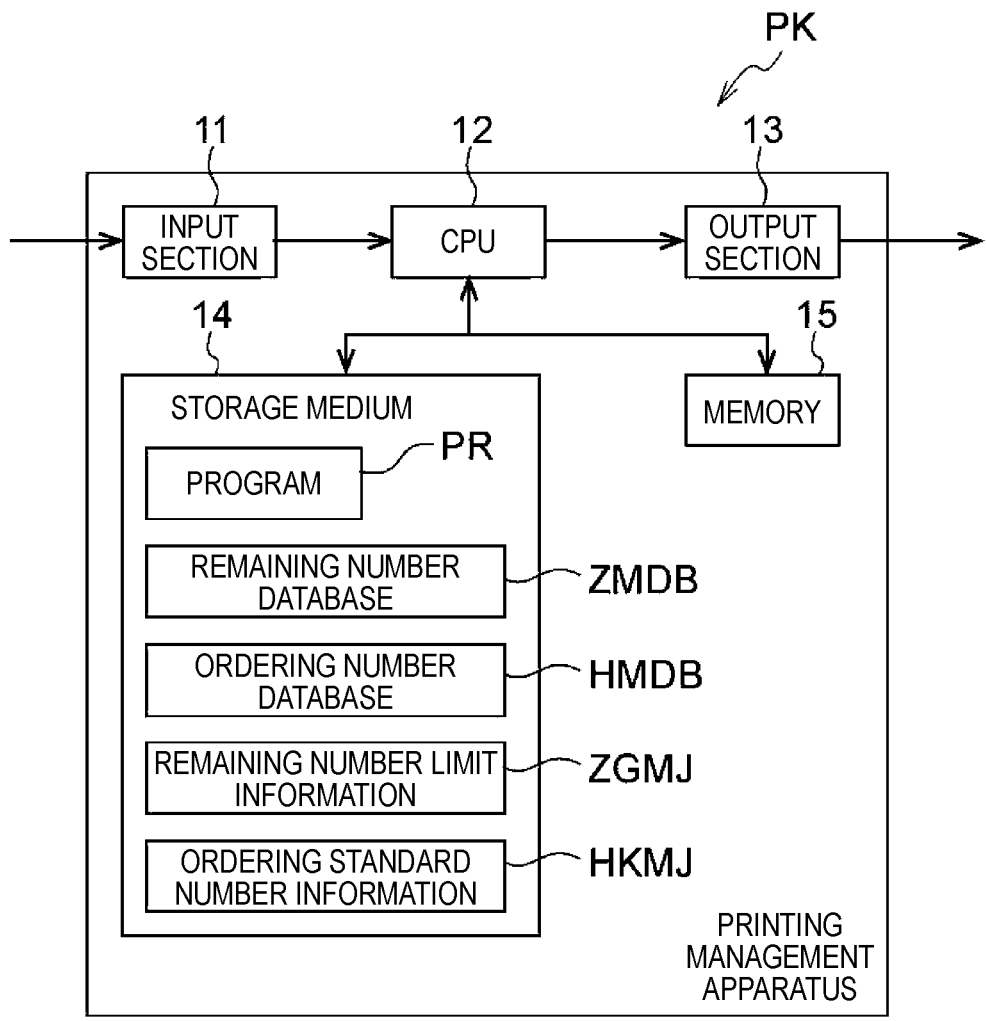

FIG. 4

| USER NAME | ORDERING NUMBER HM |
|---|---|
| US | 74 CARDS → 72 CARDS |
| | |

ORDERING NUMBER DATABASE

HMDB

FIG. 5

| REMAINING NUMBER LIMIT ZGM |
|---|
| 30 CARDS |

REMAINING NUMBER LIMIT INFORMATION

ZGMJ

| NUMBER | ORDERING STANDARD NUMBER HKM |
|---|---|
| 1 | 24 CARDS |
| 2 | 100 CARDS |
| 3 | 240 CARDS |
| 4 | 800 CARDS |

ORDERING STANDARD NUMBER INFORMATION

FIG. 15

ZMDB

| USER NAME | REMAINING NUMBER ZM |
|---|---|
| US1 | 31 CARDS → 21 CARDS --> 102 CARDS |
| US2 | 31 CARDS → 24 CARDS --> 103 CARDS |
| US3 | 31 CARDS → 26 CARDS --> 103 CARDS |
| US4 | 31 CARDS → 28 CARDS --> 103 CARDS |

REMAINING NUMBER DATABASE

FIG. 16

HMDB

| USER NAME | ORDERING NUMBER HM |
|---|---|
| US1 | 79 CARDS → 81 CARDS |
| US2 | 76 CARDS → 79 CARDS |
| US3 | 74 CARDS → 77 CARDS |
| US4 | 72 CARDS → 75 CARDS |

ORDERING NUMBER DATABASE

INFORMATION PROCESSING APPARATUS AND COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-227671 filed on Dec. 17, 2019.

BACKGROUND

1. Technical Field

The present invention relates to an information processing apparatus and a computer readable medium storing an information processing program.

2. Related Art

JP-A-2017-157077 discloses a business card automatic ordering system. The business card automatic ordering system includes a processor, a memory and a database. The memory is communicably connected to the processor and stores a module executable by the processor. The database is communicably connected to the processor and stores user data including a remaining number of business cards of a user.

The aforementioned module includes a reception module, a module for updating the remaining number of the business cards, and a module for ordering business cards. The reception module receives business card data about business cards of other persons from the user. When the reception module has received the business card data, the module for updating the remaining number of the business cards updates the remaining number of the business cards of the user data stored inside the database. When the remaining number of the business cards of the user data stored in the database is not larger than a predetermined number, the module for ordering the business cards orders the business cards of the user.

SUMMARY

When the remaining number of the business cards is reduced, the user holding the business cards may order business cards by himself/herself based on the remaining number of the business cards. However, when the number of the business cards ordered by the user is not consistent with the number of business cards which can be printed on a business card printing paper sheet, waste is generated in the business card printing paper sheet.

Aspects of non-limiting embodiments of the present disclosure provide an information processing apparatus and an information processing program which can suppress generation of waste in a resource used for objects to be produced, in comparison with a case where the objects are produced in accordance with an accepted order.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor, wherein the processor is configured to: accept an order related to production and including objects and a quantity about at least one user; and change the quantity of the accepted order so that, of a resource used for the production of the objects, a portion which cannot be used for the production is not larger than a predetermined standard.

BRIEF DESCRIPTION OF DRAWINGS

Exemplary embodiments of the present invention will be described in detail based on the following figures, wherein:

FIG. 2 is a view showing the configuration of a printing management apparatus according to Exemplary Embodiment 1;

FIG. 3 is a table showing a remaining number database according to Exemplary Embodiment 1;

FIG. 4 is a table showing an ordering number database according to Exemplary Embodiment 1;

FIG. 5 is a table showing remaining number limit information according to Exemplary Embodiment 1;

FIG. 15 is a table showing a remaining number database according to Exemplary Embodiment 2;

FIG. 16 is a table showing an ordering number database according to Exemplary Embodiment 2.

DETAILED DESCRIPTION

Exemplary embodiments of an information processing system including an information processing apparatus according to the present invention will be described below.

A "printing management system" including a "printing management apparatus" which is an example of the "information processing apparatus" will be described as each of the exemplary embodiments of the information processing system.

Exemplary Embodiment 1

<Configuration of Exemplary Embodiment 1>

Figure 1:
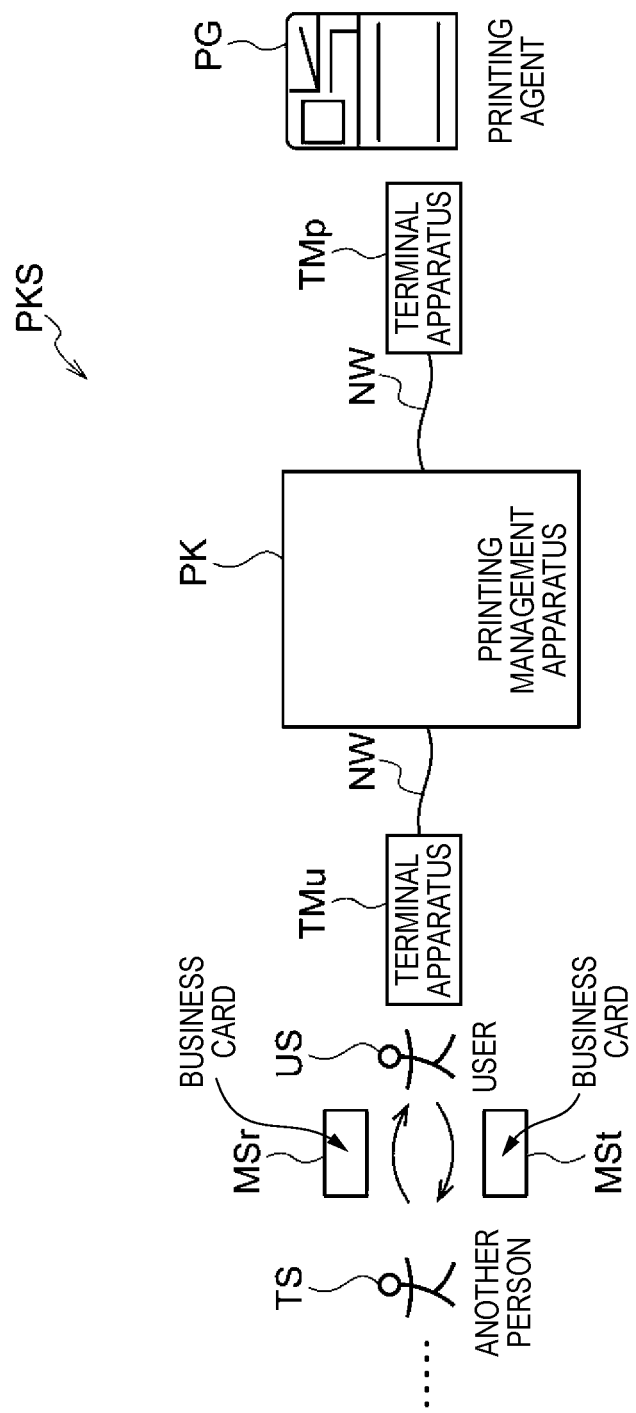
FIG. 1 is a view showing the configuration of a printing management system according to Exemplary Embodiment 1.

FIG. 1 shows the configuration of a printing management system PKS according to Exemplary Embodiment 1. The configuration of the printing management system PKS according to Exemplary Embodiment 1 will be described below with reference to FIG. 1.

The printing management system PKS according to Exemplary Embodiment 1 includes a printing management apparatus PK, a terminal apparatus TMu and a terminal apparatus TMp, as shown in FIG. 1. The printing management apparatus PK is connected to the terminal apparatus TMu and the terminal apparatus TMp through a network NW (e.g. the Internet), as shown in FIG. 1.

As shown in FIG. 1, the terminal apparatus TMu is used by a user US exchanging business cards MSr and MSt with another person TS. The user US basically holds, for example, "100" business cards MSt to exchange business cards with the other person TS.

Here, the term "business card" is an example of an "object".

The terminal apparatus TMp is used by a printing agent PG, as shown in FIG. 1.

<Configuration of Printing Management Apparatus>

FIG. 2 shows the configuration of the printing management apparatus PK according to Exemplary Embodiment 1.

As shown in FIG. 2, the printing management apparatus PK according to Exemplary Embodiment 1 includes an input section 11, a CPU 12 (Central Processing Unit), an output section 13, a storage medium 14 and a memory 15.

The input section 11 is, for example, constituted by a keyboard, a mouse, a touch panel and a network unit. The CPU 12 is an example of a processor, and serves as the core of a well-known computer which operates hardware in accordance with software. The output section 13 is, for example, constituted by a printer, a liquid crystal monitor and a network unit. The storage medium 14 is, for example, constituted by an HDD (Hard Disk Drive), an SSD (Solid State Drive) and an ROM (Read Only Memory). The memory 15 is, for example, constituted by a DRAM (Dynamic Random Access Memory) and an SRAM (Static Radom Access Memory).

The storage medium 14 stores a program PR, a remaining number database ZMDB, an ordering number database HMDB, remaining number limit information ZGMJ and ordering standard number information HKMJ.

The program PR is a group of commands defining contents of processing which should be executed by the printing management apparatus PK.

<Remaining Number Database>

FIG. 3 shows the remaining number database ZMDB according to Exemplary Embodiment 1. As shown in FIG. 3, the remaining number database ZMDB includes a "user name" and a "remaining number ZM". As shown in FIG. 3, the remaining number database ZMDB shows that, for example, a remaining number ZM of business cards MSt (shown in FIG. 1) held by a user name "US" (shown in FIG. 1) has changed, for example, from "31" to "26".

<Ordering Number Database>

FIG. 4 shows the ordering number database HMDB according to Exemplary Embodiment 1. As shown in FIG. 4, the ordering number database HMDB includes a "user name" and an "ordering number HM". The ordering number HM is a number which should be ordered in order to restore the number of the business cards MSt held by the user US to the aforementioned "100" when the remaining number ZM (shown in FIG. 3) has become smaller than a remaining number limit ZGM "30" (shown in FIG. 5) which will be described later. Therefore, when, for example, the remaining number ZM of the business cards MSt of the user US is "26", the ordering number HM of business cards MSt is intrinsically "74".

<Remaining Number Limit Information>

FIG. 5 shows the remaining number limit information ZGMJ according to Exemplary Embodiment 1. The remaining number limit information ZGMJ indicates a fact that the ordering number HM (shown in FIG. 4) of the business cards MSt should be ordered when the remaining number ZM (shown in FIG. 3) has become smaller than the remaining number limit ZGM (shown in FIG. 5). The remaining number limit ZGM is, for example, "30", as shown in FIG. 5.

<Ordering Standard Number Information>

Figure 6A:
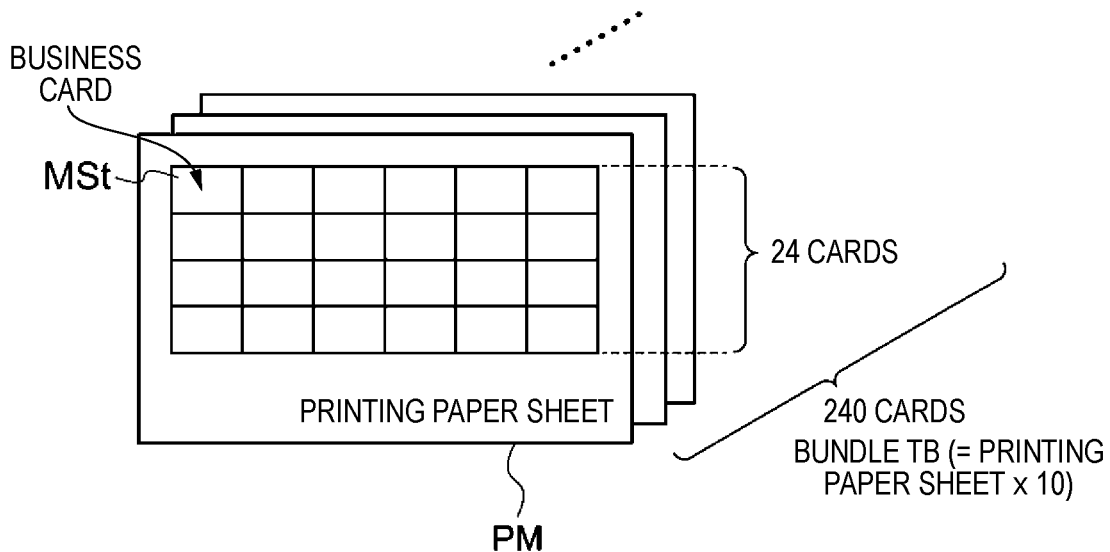
FIG. 6A is a view showing a printing paper sheet and a bundle of the printing paper sheets according to Exemplary Embodiment 1.
Figure 6B:
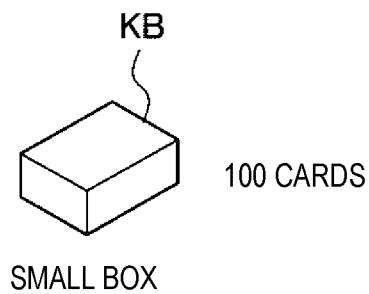
FIG. 6B is a view showing a small box according to Exemplary Embodiment 1.
Figure 6C:
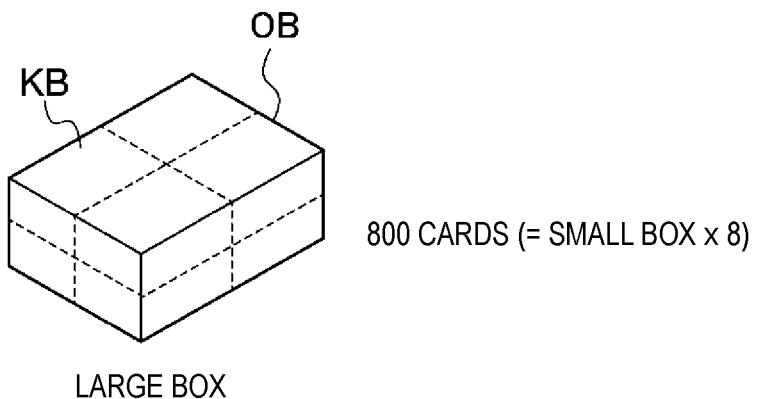
FIG. 6C is a view showing a large box according to Exemplary Embodiment 1.

FIG. 6A shows a printing paper sheet PM and a bundle TB of the printing paper sheets according to Exemplary Embodiment 1. FIG. 6B shows a small box KB according to Exemplary Embodiment 1. FIG. 6C shows a large box OB according to Exemplary Embodiment 1.

Twenty-four business cards MSt, which are an example of the "number of faces which can be printed on one printing paper sheet PM", can be printed on the printing paper sheet PM, as shown in FIG. 6A. In other words, "24" business cards MSt can be obtained from one printing paper sheet PM.

The bundle TB of the printing paper sheets PM is, for example, one unit when, for example, the printing paper sheets PM are purchased from a printing paper sheet maker (not shown). The bundle TB of the printing paper sheets PM includes ten printing paper sheets PM. Accordingly, "240" business cards MSt can be printed on one bundle TB of the printing paper sheets PM, as shown in FIG. 6B. In other words, two hundred forty business cards MSt can be obtained from one bundle TB of the printing paper sheets PM.

The small box KB is a box for receiving business cards MSt. One hundred business cards MSt can be received in the small box KB, as shown in FIG. 6B.

The large box OB is a box for receiving small boxes (shown in FIG. 6B). Eight small boxes KB can be received in the large box OB, as shown in FIG. 6C. In other words, eight hundred business cards MSt can be received in one large box.

Here, each of the printing paper sheet PM, the bundle TB of the printing paper sheets PM, the small box KB and the large box OB is an example of a "resource".

Figures 7, 8:
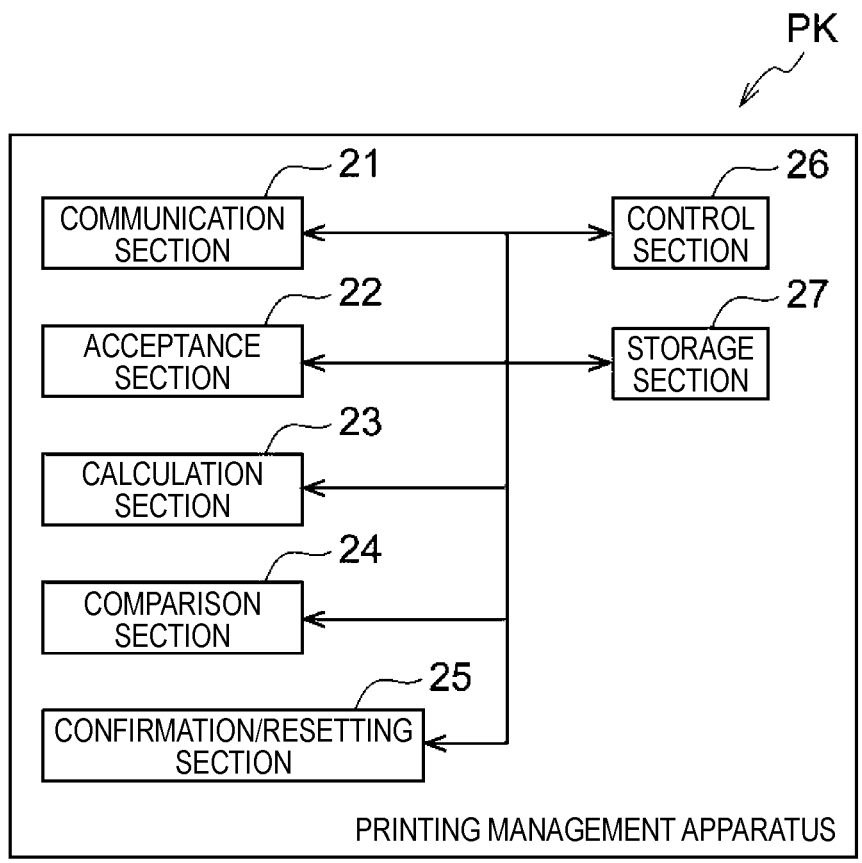
FIG. 7 is a table showing ordering standard number information according to Exemplary Embodiment 1.
FIG. 8 is a block diagram showing functions of the printing management apparatus according to Exemplary Embodiment 1.

FIG. 7 shows the ordering standard number information HKMJ according to Exemplary Embodiment 1.

The ordering standard number information HKMJ indicates ordering standard numbers HKM which are standard numbers for ordering business cards MSt. Each of the ordering standard numbers HKM is an example of a "predetermined quantity standard". Specifically, the ordering standard numbers HKM are "24", "100", "240" and "800", as shown in FIG. 7.

The ordering standard number HKM "24" corresponds to the aforementioned "24" business cards MSt which can be obtained from one printing paper sheet PM.

The ordering standard number HKM "100" corresponds to the aforementioned "100" business cards MSt which can be received in one small box KB.

The ordering standard number HKM "240" corresponds to the aforementioned "240" business cards MSt which can be obtained from one bundle TB of the printing paper sheets PM.

The ordering standard number HKM "800" corresponds to the aforementioned "800" business cards MSt which can be received in one large box OB.

<Functions of Printing Management Apparatus>

FIG. 8 is a block diagram showing functions of the printing management apparatus PK according to Exemplary Embodiment 1.

As shown in FIG. 8, the printing management apparatus PK includes a communication section 21, an acceptance section 22, a calculation section 23, a comparison section 24, a confirmation/resetting section 25, a control section 26 and a storage section 27.

The relation between the hardware configuration (shown in FIG. 2) and the functional configuration (shown in FIG. 8) in the printing management apparatus PK is described as follows. That is, in the hardware respect, the CPU 12 executes the program PR stored in the storage medium 14 (implementing a portion of the function of the storage section 27) while using the memory 15 (implement another portion of the function of the storage section 27), and serves as the control section 26 to control operations of the input section 11 and the output section 13 in response to necessity. Thus, the CPU 12 implements the respective functions of the communication section 21, the acceptance section 22, the calculation section 23, the comparison section 24 and the confirmation/resetting section 25. The functions of the respective sections will be described later.

<Configuration of Terminal Apparatus of User>

Figure 9:
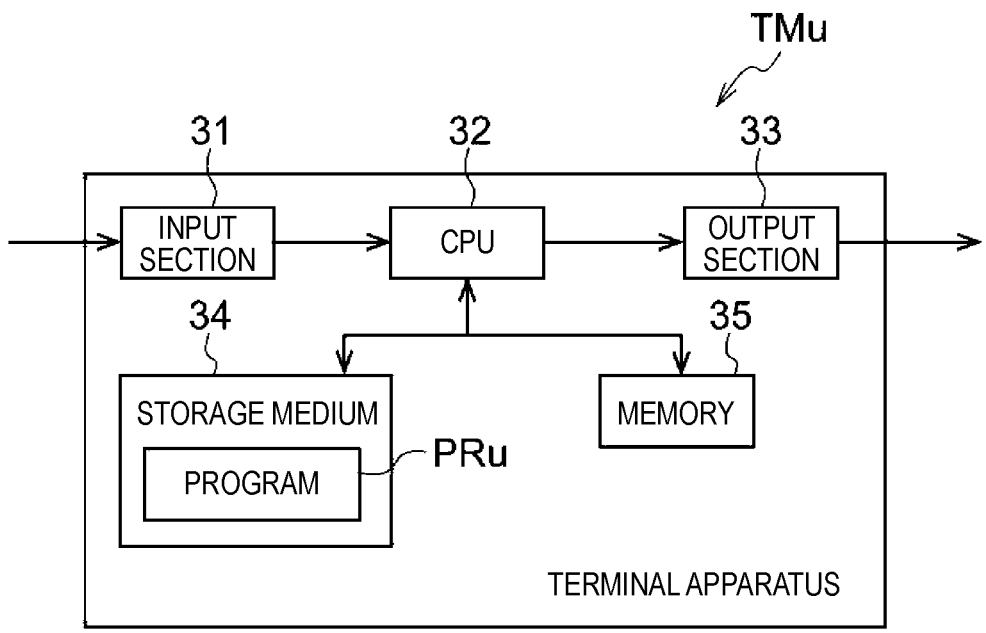
FIG. 9 is a view showing the configuration of a terminal apparatus of a user according to Exemplary Embodiment 1.

FIG. 9 shows the configuration of the terminal apparatus TMu of the user according to Exemplary Embodiment 1.

As shown in FIG. 9, the terminal apparatus TMu includes an input section 31, a CPU 32, an output section 33, a storage medium 34 and a memory 35, in a similar manner to or the same manner as the configuration (shown in FIG. 2) of the printing management apparatus PK.

In a similar manner to or the same manner as the input section 11 of the printing management apparatus PK, the input section 31 is, for example, constituted by a keyboard, a mouse, a touch panel and a network unit.

In a similar manner to or the same manner as the CPU 12 of the printing management apparatus PK, the CPU 32 is an example of a processor, and serves as the core of a well-known computer which operates hardware in accordance with software.

In a similar manner to or the same manner as the output section 13 of the printing management apparatus PK, the output section 33 is, for example, constituted by a printer, a liquid crystal monitor and a network unit.

In a similar manner to or the same manner as the storage medium 14 of the printing management apparatus PK, the storage medium 34 is, for example, constituted by an HDD (Hard Disk Drive), an SSD (Solid State Drive) and an ROM (Read Only Memory).

In a similar manner to or the same manner as the memory 15 of the printing management apparatus PK, the memory 35 is, for example, constituted by a DRAM (Dynamic Random Access Memory) and an SRAM (Static Random Access Memory).

As shown in FIG. 9, the storage medium 34 stores a program PRu. The program PRu is a group of commands defining the contents of processing which should be executed by the terminal apparatus TMu.

<Functions of Terminal Apparatus of User>

Figure 10:
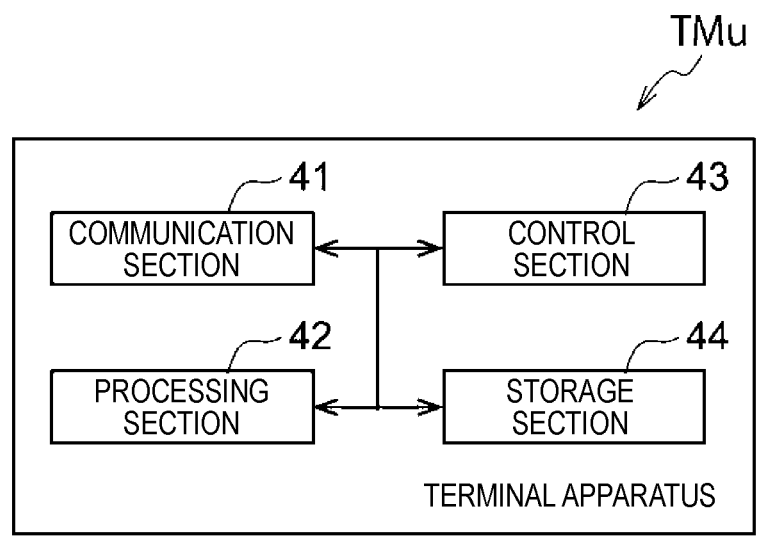
FIG. 10 is a block diagram showing functions of the terminal apparatus of the user according to Exemplary Embodiment 1.

FIG. 10 is a block diagram showing functions of the terminal apparatus TMu of the user according to Exemplary Embodiment 1.

As shown in FIG. 10, the terminal apparatus TMu includes a communication section 41, a processing section 42, a control section 43 and a storage section 44.

The relation between the hardware configuration (shown in FIG. 9) and the functional configuration (shown in FIG. 10) in the terminal apparatus TMu is described as follows. That is, in the hardware respect, the CPU 32 executes the program PRu stored in the storage medium 34 (implementing a portion of the function of the storage section 44) while using the memory 35 (implementing another portion of the function of the storage section 44), and serves as the control section 43 to control operations of the input section 31 and the output section 33) in response to necessity. Thus, the CPU 32 implements the respective functions of the communication section 41 and the processing section 42. The functions of the respective sections will be described later.

<Configuration of Terminal Apparatus of Printing Agent>

Figure 11:
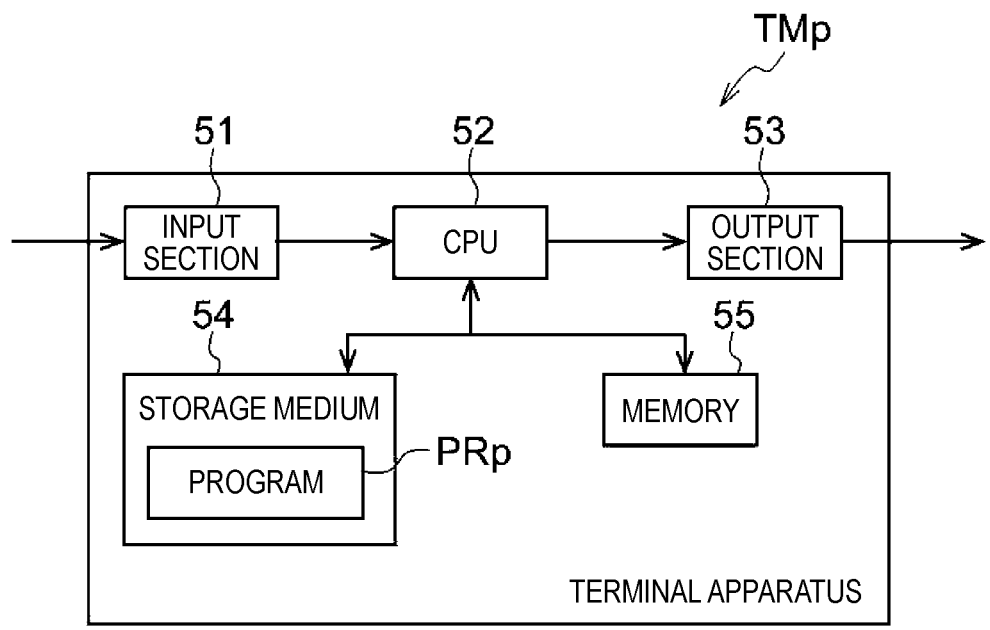
FIG. 11 is a view showing the configuration of a terminal apparatus of a printing agent according to Exemplary Embodiment 1.

FIG. 11 shows the configuration of the terminal apparatus TMp of the printing agent according to Exemplary Embodiment 1.

As shown in FIG. 11, the terminal apparatus TMp includes an input section 51, a CPU 52, an output section 53, a storage medium 54 and a memory 55, in a similar manner to or the same manner as the configuration (shown in FIG. 9) of the terminal apparatus TMu.

In a similar manner to or the same manner as the input section 31 of the terminal apparatus TMu, the input section 51 is, for example, constituted by a keyboard, a mouse, a touch panel and a network unit.

In a similar manner to or the same manner as the CPU 32 of the terminal apparatus TMu, the CPU 52 is an example of a processor, and serves as the core of a well-known computer which operates hardware in accordance with software.

In a similar manner to or the same manner as the output section 33 of the terminal apparatus TMu, the output section 53 is, for example, constituted by a printer, a liquid crystal monitor and a network unit.

In a similar manner to or the same manner as the storage medium 34 of the terminal apparatus TMu, the storage medium 54 is, for example, constituted by an HDD (Hard Disk Drive), an SSD (Solid State Drive) and an ROM (Read Only Memory).

In a similar manner to or the same manner as the memory 35 of the terminal apparatus TMu, the memory 55 is, for example, constituted by a DRAM (Dynamic Random Access Memory) and an SRAM (Static Random Access Memory).

As shown in FIG. 11, the storage medium 54 stores a program PRp. The program PRp is a group of commands defining the contents of processing which should be executed by the terminal apparatus TMp.

<Functions of Terminal Apparatus of Printing Agent>

Figure 12:
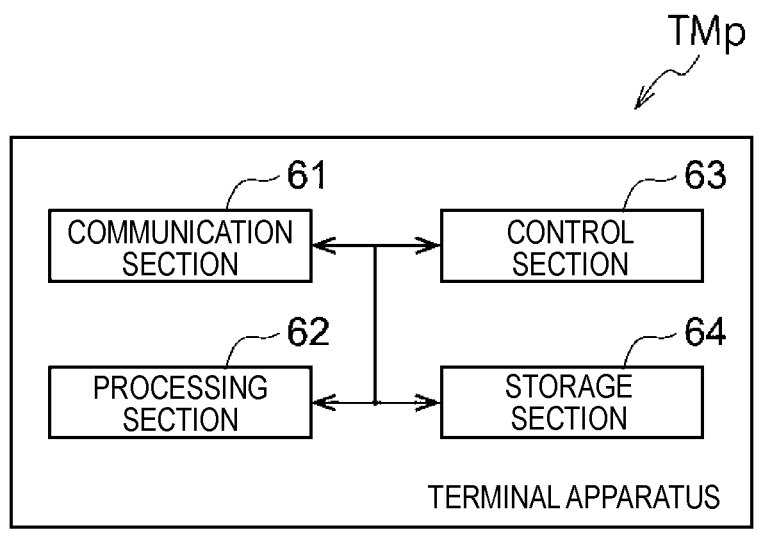
FIG. 12 is a block diagram showing functions of the terminal apparatus of the printing agent according to Exemplary Embodiment 1.

FIG. 12 is a block diagram showing functions of the terminal apparatus TMp of the printing agent according to Exemplary Embodiment 1.

As shown in FIG. 12, the terminal apparatus TMp includes a communication section 61, a processing section 62, a control section 63 and a storage section 64, in a similar manner to or the same manner as the function (shown in FIG. 10) of the terminal apparatus TMu of the user.

The relation between the hardware configuration (shown in FIG. 11) and the functional configuration (shown in FIG. 12) in the terminal apparatus TMp is described as follows. That is, in the hardware respect, the CPU 52 executes the program PRp stored in the storage medium 54 (implementing a portion of the function of the storage section 64) while using the memory 55 (implementing another portion of the function of the storage section 64), and serves as the control section 63 to control operations of the input section 51 and the output section 53 in response to necessity. Thus, the CPU 52 implements the respective functions of the communication section 61 and the processing section 62. The functions of the respective sections will be described later.

<Operation of Exemplary Embodiment 1>

Figure 13:
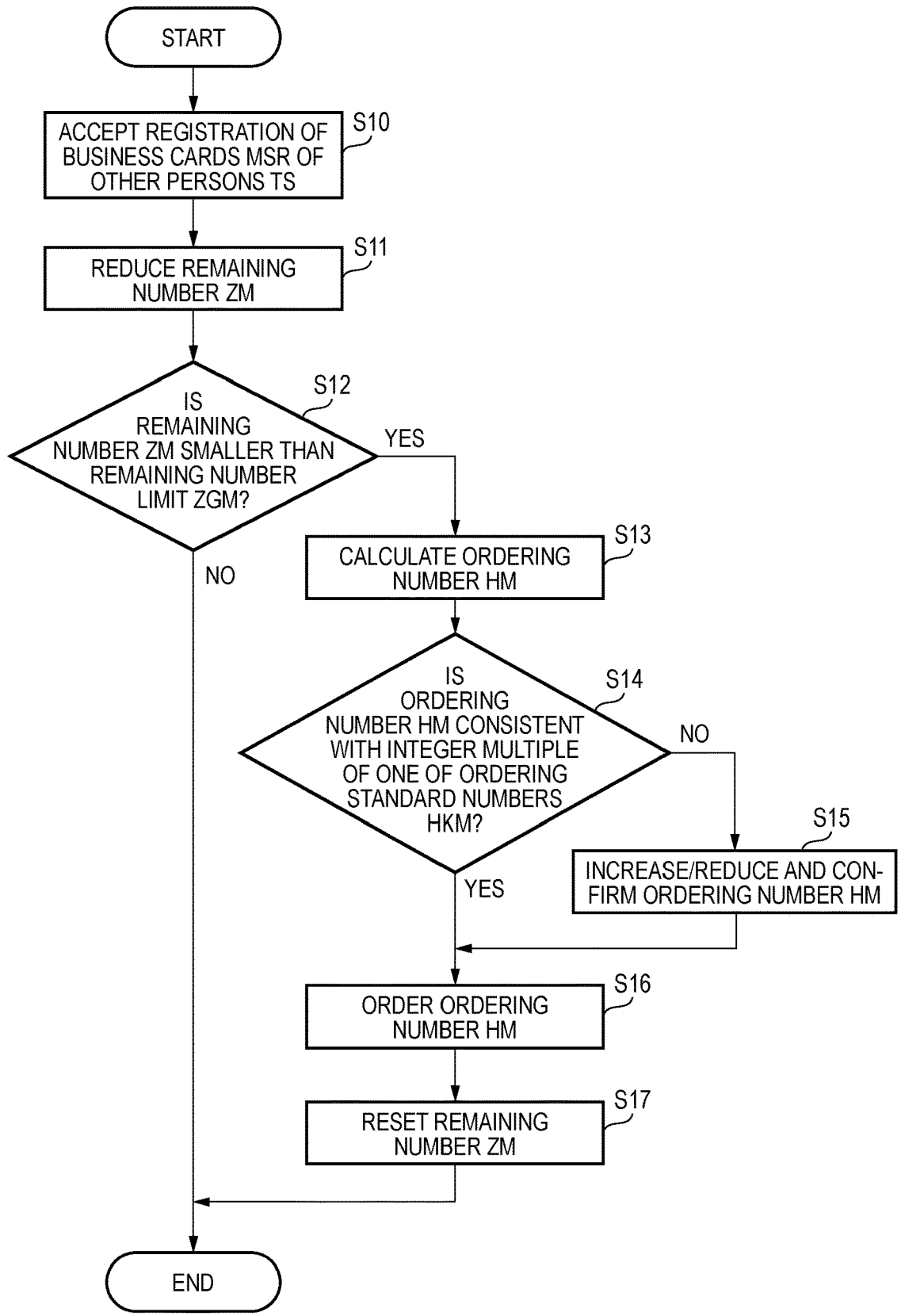
FIG. 13 is a flow chart showing operation of the printing management system according to Exemplary Embodiment 1.

FIG. 13 is a flow chart showing operation of the printing management system PKS according to Exemplary Embodiment 1. The operation of the printing management system PKS will be described below with reference to the flow chart of FIG. 13.

In order to make it easy to describe and understand, assume that the remaining number ZM about the user US is originally "31", and then reduced to "26" by business card exchange with "5" other persons TS, as shown in FIG. 3.

In addition, assume that a "predetermined permissible standard" (which is an example of a "predetermined standard") which is the size of a portion which is allowed not to be used for printing of any business card MSt (a portion corresponding to so-called waste paper or spoiled paper), of the printing paper sheet PM (shown in FIG. 6A), is "0" on a business card MSt basis. In other words, assume that the ordering number HM (shown in FIG. 4) of business cards MSt is preferably consistent with an integer multiple of "24" which is the number of business cards MSt that can be obtained from the printing paper sheet PM.

Step S10: the user US uses the terminal apparatus TMu to register "5" business cards MSr received from the "5" other persons TS into the printing management apparatus PK. In other words, in the printing management apparatus PK, the CPU 12 (shown in FIG. 2) serves as the communication section 21 and the acceptance section 22 (shown in FIG. 8) to accept the registration of the business cards MSr of the other persons TS through the network NW from the CPU 32 which serves as the communication section 41 (shown in FIG. 10) of the terminal apparatus TMu.

Step S11: when having accepted the registration of the "5" business cards MSr of the other persons TS in the step S10, the CPU 12 in the printing management apparatus PK serves as the calculation section 23 (shown in FIG. 8) to reduce the remaining number ZM of the business cards MSt of the user US accordingly in the remaining number database ZMDB (shown in FIG. 3). Thus, the remaining number ZM is changed from "31" to "26", as shown in FIG. 3. In other words, the CPU 12 estimates that the remaining number of the business cards MSt of the user US has changed to "26".

Step S12: when having reduced the remaining number ZM in the step S11, the CPU 12 in the printing management apparatus PK serves as the comparison section 24 (shown in FIG. 8) to determine whether the remaining number ZM is smaller than the remaining number limit ZGM "30" indicated by the remaining number limit information ZGMJ (shown in FIG. 5) or not. Since the remaining number ZM "26" is smaller than the remaining number limit ZGM "30", processing goes to "YES".

Incidentally, when the remaining number ZM is not smaller than the remaining number limit ZGM, the processing goes to "NO".

Step S13: when having determined that the remaining number ZM is smaller than the remaining number limit ZGM in the step S12, the CPU 12 in the printing management apparatus PK serves as the calculation section 23 to calculate an ordering number HM based on the remaining number ZM "26". Since the number of business cards MSt which should be held by the user US is "100", the CPU 12 calculates the ordering number HM to be "74" (=100-26). In other words, the CPU 12 determines the ordering number HM of the business cards MSt as "74".

Step S14: when having calculated the ordering number HM in the step S13, the CPU 12 in the printing management apparatus PK serves as the comparison section 24 to determine whether the ordering number HM "74" is consistent with an integer multiple of one of the ordering standard numbers HKM "24", "100", "240" and "800" in the ordering standard number information HKMJ (shown in FIG. 7) or not. Since the ordering number HM "74" is not consistent with the integer multiple of any of the ordering standard numbers HKM "24", "100", "240" and "800", the processing goes to "NO".

Incidentally, when the ordering number HM is consistent with the integer multiple of one of the ordering standard numbers HKM, the processing goes to "YES".

Step S15: when having determined that the ordering number HM "74" is not consistent with the integer multiple of any of the ordering standard numbers HKM in the step S14, the CPU 12 in the printing management apparatus PK serves as the calculation section 23 to change, i.e. increase or reduce the ordering number HM "74" so as to make the ordering number HM consistent with the integer multiple of one of the ordering standard numbers HKM "24", "100", "240" and "800".

Here, the ordering number HM "74" is, for example, closest to "72" which is three times as many as the ordering standard numbers HKM "24". Therefore, the CPU 12 serves as the calculation section 23 to reduce the ordering number HM from "74" to "72" and serves as the confirmation/resetting section 25 (shown in FIG. 8) to confirm the ordering number HM as "72".

Step S16: when having confirmed the ordering number HM as "72" in the step S15, the CPU 12 in the printing management apparatus PK serves as the communication section 21 (shown in FIG. 8) to place an order for the ordering number HM "72" of business cards MSt to the printing agent PG using the terminal apparatus TMp through the network NW.

Step S17: when having completed the order for the ordering number HM "72" of business cards MSt in the step S16, the CPU 12 in the printing management apparatus PK serves as the confirmation/resetting section to reset the remaining number ZM from "26" to "98" (=26+72), as shown in FIG. 3.

<Modification 1: To be Consistent with One of Two Integer Multiples of Two Ordering Standard Numbers HKM>

Assume that, for example, the user US exchanges business cards with "29" other persons TS instead of exchanging business cards with the aforementioned "5" other persons TS. After the aforementioned business card exchange, the CPU 12 changes the remaining number ZM from "31" to "2"

in the aforementioned step S11. After the change in the remaining number ZM, the processing goes through the aforementioned step S12. After the step S12, the CPU 12 calculates the ordering number HM to be "98" (=100-2) in the aforementioned step S13.

After the step S13, the processing goes through the aforementioned step S14. After the step S14, the ordering number HM "98" is closest to both "96" which is four times as many as the ordering standard number HKM "24" (shown in FIG. 7) and "100" which is one time as many as the ordering standard number HKM "100" (shown in FIG. 7) in the aforementioned step S15. Therefore, the CPU 12 may first increase or reduce the ordering number HM to make the ordering number HM consistent with either of "96" and "100", and then confirm the ordering number HM.

<Modification 2: To be Consistent with Both of Two Integer Multiples of Two Ordering Standard Numbers HKM>

Assume, for example, preparation for a situation in which the user US will exchange business cards with a large number of other persons TS in the near future, regardless of whether the user US has exchanged business cards with the aforementioned "5" other persons TS or not. For example, the user US issues an instruction to make a request of an order for "250" business cards MSt from the terminal apparatus TMu to the printing management apparatus PK. In other words, in this case, the printing management apparatus PK accepts the request of the order for the ordering number HM "250" of the business cards MSt from the user US. After the acceptance of the aforementioned request for the order, processing goes through the aforementioned step S14 without executing the aforementioned steps S10 to S13.

In the aforementioned step S15, the ordering number HM "250" is, for example, closest to both "240" which is ten times as many as the ordering standard number HKM "24" (shown in FIG. 7), and "240" which is one time as many as the ordering standard number HKM "240". Therefore, the CPU 12 may first reduce the ordering number HM to make the ordering number HM consistent with "240", and then confirm the ordering number HM.

<Modification 3: Variation of Predetermined Permissible Standard>

The aforementioned "predetermined permissible standard" may be, for example, a number such as "1", "2" or "3" in place of "0" on a business card MSt basis. In addition, the "predetermined permissible standard" may be, for example, a ratio such as "10%" (corresponding to "2.4" on the business card MSt basis) based on "24" business cards MSt which can be obtained from one printing paper sheet PM. Assume that the "predetermined permissible standard" is, for example, set at "2". In this case, for example, an ordering number HM "90" may be changed to "94" (=96-2) instead of being changed to "96" (=24×4).

Incidentally, the "object" may be, for example, a "leaflet" or an "advertisement" in place of the aforementioned "business card".

<Modification 4: Variation when Business Cards are Printed in Imposition>

It is preferable that twenty-four business cards MSt are printed on one printing paper sheet PM in FIG. 6 relevantly to Modification 3. However, of the printing paper sheet PM, the size of a portion where no business card MSt is printed (which is an example of a "portion which cannot be used for production" or a "portion where no printing image is formed") is changed according to the number (number of copies) of business cards MSt to be printed. In this case, the ordering number HM is not changed (reduced) from "74" to "72" (=24×3) but may be increased from "74" to "96" (=24×4) in order to prevent an unprinted portion from being generated in a printing paper sheet PM. "22" (=96-74) which is not delivered as the order this time may be stored so that they can be, for example, delivered when a next order is received.

Exemplary Embodiment 2

<Configuration of Exemplary Embodiment 2>

Figure 14:
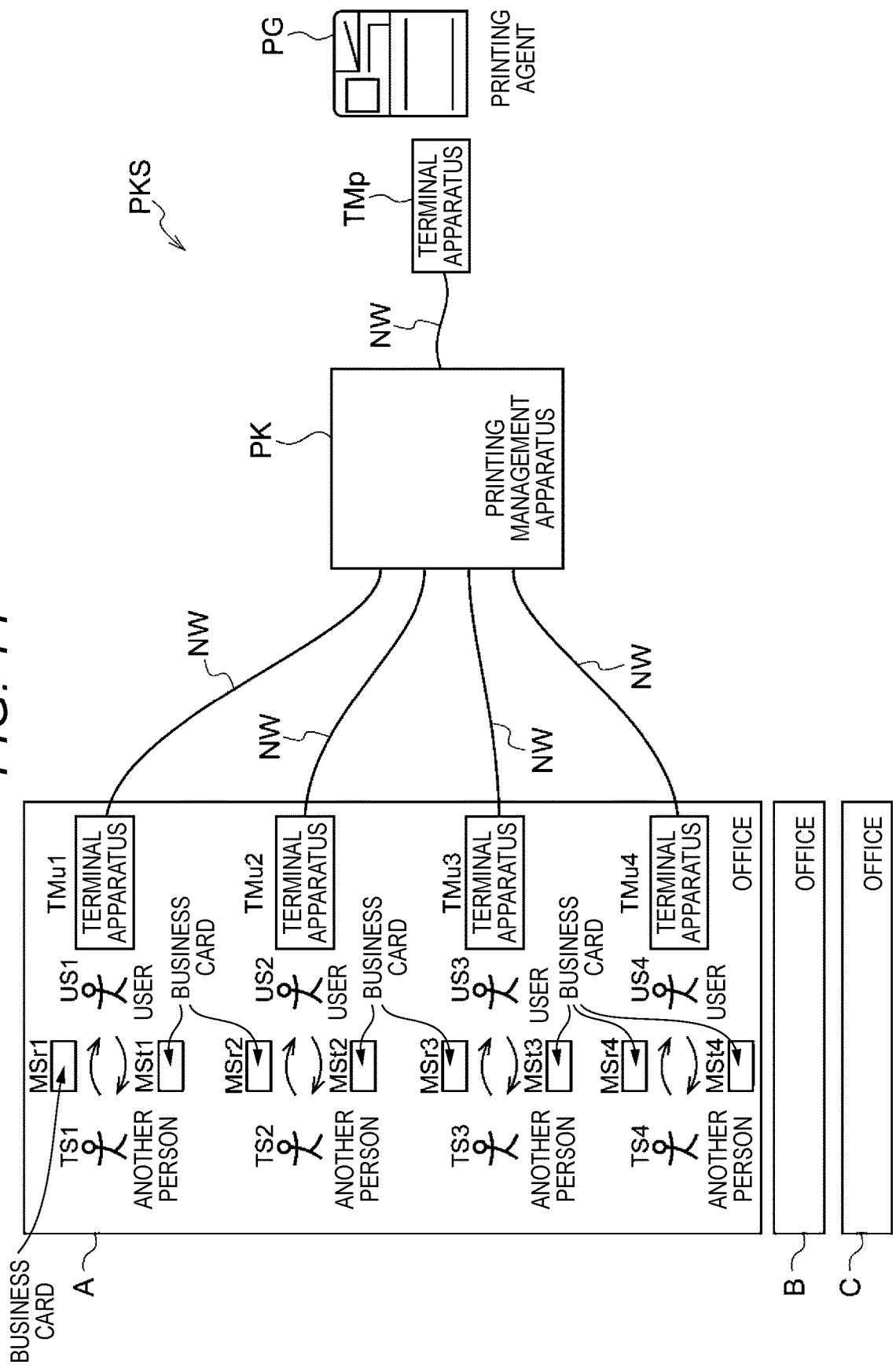
FIG. 14 is a view showing the configuration of a printing management system according to Exemplary Embodiment 2.

FIG. 14 shows the configuration of a printing management system PKS according to Exemplary Embodiment 2. The configuration of the printing management system PKS according to Exemplary Embodiment 2 will be described below with reference to FIG. 14.

As shown in FIG. 14, the printing management system PKS according to Exemplary Embodiment 2 includes plural terminal apparatuses TMu in place of one terminal apparatus TMu in the printing management system PKS (shown in FIG. 1) according to Exemplary Embodiment 1.

Specifically, at an office A in a company, a user US1 using the terminal apparatus TMu1 hands a business card MSt1 of the user US1 over to another person TS1, and receives a business card MSr1 of the other person TS1 from the other person TS1. In a similar manner to or the same manner as the user US1, other users US2 to US4 also hand business card MSt2 to MSt4 of the users US2 to US4 over to other persons TS2 to TS4 respectively, and also receive business cards MSr2 to MSr4 of the other persons TS2 to TS4 from the other persons TS2 to TS4 respectively.

Other offices B and C also have configurations similar to or the same as that of the aforementioned office A.

<Configurations and Functions of Printing Management Apparatus, Terminal Apparatuses of Users, and Terminal Apparatus of Printing Agent>

Configurations and functions of a printing management apparatus PK, the terminal apparatuses TMu1 to TMu4 . . . of the users US1 to US4 . . . and terminal apparatus TMp of a printing agent PG according to Exemplary Embodiment 2 are similar to or the same as those of the printing management apparatus PK (shown in FIG. 2 and FIG. 8), the terminal apparatus TMu (shown in FIG. 9 and FIG. 10), and the terminal apparatus TMp (shown in FIG. 11 and FIG. 12) according to Exemplary Embodiment 1.

<Remaining Number Database>

FIG. 15 shows a remaining number database ZMDB according to Exemplary Embodiment 2.

The remaining number database ZMDB according to Exemplary Embodiment 2 includes plural "user names" and plural "remaining numbers ZM" differently from the remaining number database ZMDB (shown in FIG. 3) according to Exemplary Embodiment 1.

Specifically, the remaining number database ZMDB according to Exemplary Embodiment 2 shows that, for example, the remaining numbers ZM about the user names "US1", "US2", "US3", "US4", . . . (shown in FIG. 14) have changed from "31" to "21", "24", "26", "28", . . . respectively.

<Ordering Number Database>

FIG. 16 shows an ordering number database HMDB according to Exemplary Embodiment 2.

The ordering number database HMDB according to Exemplary Embodiment 2 includes plural "user names" and plural "ordering numbers HM" differently from the ordering number database HMDB (shown in FIG. 4) according to Exemplary Embodiment 1.

Specifically, the ordering number database HMDB according to Exemplary Embodiment 2 shows that the ordering numbers HM about the user names "US1", "US2", "US3", "US4", . . . (shown in FIG. 14) should be intrinsically "79" (=100-21), "76" (=100-24), "74" (=100-26), "72" (=100-28), . . . correspondingly to the aforementioned remaining numbers ZM "21", "24", "26", "28", . . . , respectively.

<Operation of Exemplary Embodiment 2>

Figure 17:
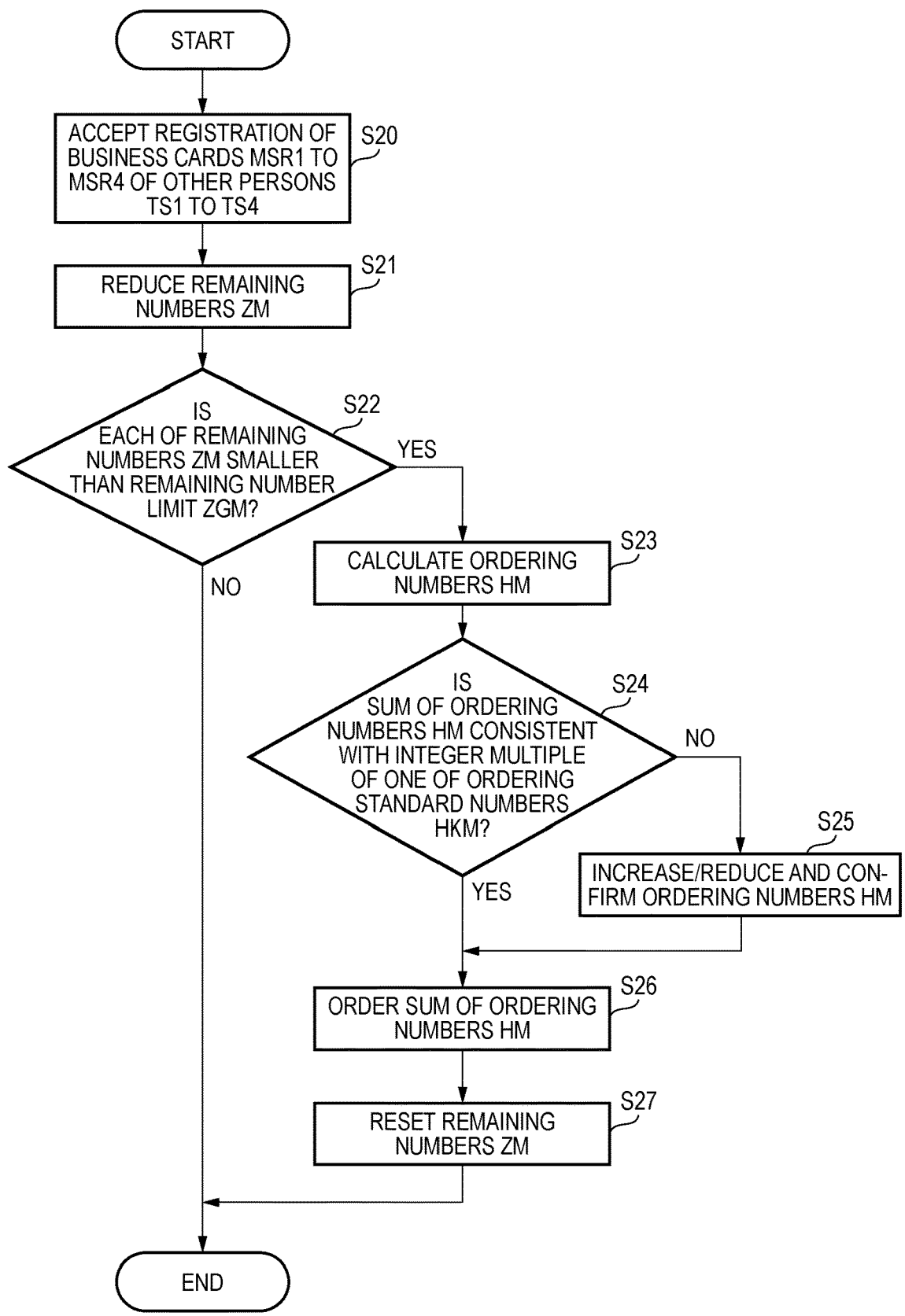
FIG. 17 is a flow chart showing operation of the printing management system according to Exemplary Embodiment 2.

FIG. 17 is a flow chart showing operation of the printing management system PKS according to Exemplary Embodiment 2. The printing management system PKS according to Exemplary Embodiment 2 will be described below with reference to the flow chart of FIG. 17.

In order to make it easy to describe or understand hereinafter, assume that the users US1 to US4 belonging to one and the same office A exchange business cards with "10" other persons TS1, "7" other persons TS2, "5" other persons TS3, and "3" other persons TS4, respectively.

Step S20: in a similar manner to or the same manner as the step S10 according to Exemplary Embodiment 1, the user US1 uses the terminal apparatus TMu1 to register business cards MSr1 received from the other persons TS1 into the printing management apparatus PK. In other words, a CPU 12 (shown in FIG. 2) in the printing management apparatus PK serves as a communication section 21 and an acceptance section 22 (shown in FIG. 8) to accept the registration of the business cards MSr1 of the other persons TS1 from a CPU 32 serving as a communication section 41 (shown in FIG. 10) of the terminal apparatus TMu1 through a network NW.

The CPU 12 in the printing management apparatus PK accepts registration of business cards MSr2 to MSr4 which the other users US2 to US4 have received from the other persons TS2 to TS4 in a similar manner to or the same manner as the user US1.

Step S21: when having accepted the registration of the business cards MSr1 to MSr4 of the other persons TS1 to TS4 in the step S20, the CPU 12 in the printing management apparatus PK serves as a calculation section 23 (shown in FIG. 8) to reduce the remaining numbers ZM of business cards MSt1 to MSt4 of the users US1 to US4 accordingly respectively in the remaining number database ZMDB (shown in FIG. 15). Thus, the remaining numbers ZM of the business cards MSt1 to MSt4 of the users US1 to US4 are changed from "31" to "21" (=31-10), "24" (=31-7), "26" (=31-5) and "28" (=31-3) respectively, as shown in FIG. 15.

Step S22: when having reduced the remaining numbers ZM of the business cards MSt1 to MSt4 of the users US1 to US4 in the step S21, the CPU 12 in the printing management apparatus PK serves as a comparison section 24 (shown in FIG. 8) to determine whether each of the remaining numbers ZM "21", "24", "26" and "28" of the business cards MSt1 to MSt4 of the users US1 to US4 is smaller than a remaining number limit ZGM "30" (shown in FIG. 5) or not. Since each of the remaining numbers ZM "21", "24", "26" and "28" is smaller than the remaining number limit ZGM "30" (shown in FIG. 5), processing goes to "YES".

Incidentally, when each of the remaining numbers ZM is not smaller than the remaining number limit ZGM, the processing goes to "NO".

Step S23: when having determined that each of the remaining numbers ZM is smaller than the remaining number limit ZGM in the step S22, the CPU 12 in the printing management apparatus PK serves as the calculation section 23 to calculate ordering numbers HM based on the remaining numbers ZM "21", "24", "26" and "28" respectively.

The CPU 12 calculates the ordering number HM about the user US1 to be "79" (=100-21), as shown in FIG. 16.

In a similar manner or the same manner, the CPU 12 calculates the ordering numbers HM about the users US2, US3 and US4 to be "76" (=100-24), "74" (=100-26) and "72" (=100-28) respectively, as shown in FIG. 16.

Step S24: when having calculated the ordering numbers HM in the step S23, the CPU 12 in the printing management apparatus PK serves as the comparison section 24 (shown in FIG. 8) to bundle the four ordering numbers HM into one group. The CPU 12 determines whether the sum "301" (=79+76+74+72) of the ordering numbers HM is consistent with an integer multiple of one of ordering standard numbers HKM "24", "100", "240" and "800" (shown in FIG. 7) or not. Since the sum "301" of the ordering numbers HM is not consistent with the integer multiple of any of the ordering standard numbers HKM "24", "100", "240" and "800", processing goes to "NO".

Incidentally, when the sum of the ordering numbers HM is consistent with the integer multiple of one of the ordering standard numbers HKM, the processing goes to "YES".

Step S25: when having determined that the sum "301" of the ordering numbers HM is not consistent with the integer multiple of any of the ordering standard numbers HKM in the step S24, the CPU 12 in the printing management apparatus PK serves as the calculation section 23 to increase or reduce the sum of the ordering numbers HM so as to make the sum of the ordering numbers HM consistent with an integer multiple of one of the ordering standard numbers HKM.

Here, the sum "301" of the ordering numbers HM is closest to "312" which is 13 times as many as the ordering standard number HKM "24". Therefore, the CPU 12 increases or reduces the ordering numbers HM about the users US1 to US4 so as to make the sum of the ordering numbers HM consistent with "312".

Specifically, the CPU 12 increases the ordering numbers HM about the four users US1 to US4, for example, by "2", "3", "3" and "3" (≈11/4) respectively so as to increase the sum of the ordering numbers HM by "11" (=312-301). Thus, the CPU 12 changes the ordering numbers HM about the users US1 to US4 to "81" (=79+2), "79" (=76+3), "77" (=74+3), and "75" (=72+3) respectively. In addition, the CPU 12 serves as a confirmation/resetting section 25 (shown in FIG. 8) to confirm the sum of the ordering numbers HM as "312".

Step S26: when having confirmed the sum of the ordering numbers HM as "312" in the step S25, the CPU 12 in the printing management apparatus PK serves as the communication section 21 (shown in FIG. 8) to place an order for the sum "312" of the ordering numbers HM to the terminal apparatus TMp through the network NW. More accurately, the CPU 12 places an order for the ordering numbers HM "81", "79", "77" and "75" about the users US1 to US4.

Step S27: when having completed the order for the sum "312" of the ordering numbers HM in the step S26, the CPU 12 in the printing management apparatus PK serves as the confirmation/resetting section 25 to reset the remaining number ZM about the user US1 from "21" to "102" (=21+81). In a similar manner or the same manner, the CPU 12 resets the remaining number ZM about the user US2 from "24" to "103" (=24+79), resets the remaining number ZM about the user US3 from "26" to "103" (=26+77), and resets the remaining number ZM about the user US4 from "28" to "103" (=28+75).

<Modification 1: To be consistent with Large Box OB)

Assume that users US1 to US4 make requests of orders for ordering numbers HM "170", "190", "210" and "220" respectively to a printing management apparatus PK regardless of respective remaining numbers ZM. In other words, assume that a CPU 12 in the printing management apparatus PK accepts the requests of the orders for the ordering numbers HM "170", "190", "210" and "220" respectively from the users US1 to US4. Processing goes through the step S24 without executing the aforementioned steps S20 to S23.

In the aforementioned step S25, the CPU 12 in the printing management apparatus PK increases or reduces the sum of the ordering numbers HM so as to make the sum "790" (=170+190+210+220) of the ordering numbers HM consistent with an integer multiple of one of ordering standard numbers HKM "24", "100", "240" and "800".

Here, the sum "790" of the ordering numbers HM is closest to "800" which is one time as many as the ordering standard number HKM "800". Moreover, each of the ordering numbers HM is preferably an integer multiple of "100" for a small box in order to make the sum of the ordering numbers HM consistent with "800" for a large box OB (shown in FIG. 6C).

Therefore, the CPU 12 increases the sum of the ordering numbers HM about the users US1 to US4 from "790" to "800" (=800×1). Moreover, the CPU 12 increases the ordering number HM about the user US1 from "170" to "200" (=100×2). In addition, the CPU 12 changes the ordering number HM about the user US2 from "190" to "200" (=100×2). The CPU 12 reduces the ordering number HM about the user US3 from "210" to "200" (=100×2). The CPU 12 further reduces the ordering number HM about the user US4 from "220" to "200" (=100×2). In addition, the CPU 12 serves as a confirmation/resetting section 25 (shown in FIG. 8) to confirm the sum of the ordering numbers HM as "800".

<Modification 2: To Incorporate One Person to One Group of Persons>

When each of remaining numbers ZM about four users US1 to US4 belonging to an office A is lower than an ordering standard number HKM as described above, ordering numbers HM about the aforementioned four users US1 to US4 are summed up. Alternatively, when the remaining number ZM about one user US1 belonging to the office A is lower than the ordering standard number HKM, the ordering numbers HM about the users US1 to US4 belonging to one and the same office A as the user US1 may be summed up.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

<Supplementary Explanation of Processor and Program>

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In each of the aforementioned exemplary embodiments, the program PR, PRu, PRp may be recorded and provided in any of recording media such as a CD-ROM (Compact Disc Read Only Memory), a DVD-ROM (Digital Versatile Disc Read Only Memory) and a USB (Universal Serial Bus) memory instead of being stored (installed) in advance in the storage medium 14, 34, 54, or may be downloaded from an external apparatus through the network.

REFERENCE SIGNS LIST

PKS printing management system
TMu terminal apparatus
US user
TS another person
MSr business card
MSt business card
TMp terminal apparatus
PK printing management apparatus
PG printing agent
NW network

What is claimed is:

1. An information processing apparatus comprising:
a processor; wherein:
the processor is configured to:
calculate an order number of objects of a user if a number of the objects of the user is smaller than a predetermined number limit; and
change the order number of the objects so that, of a resource used for production of the objects, a portion which cannot be used for the production is not larger than a predetermined standard.

2. The information processing apparatus according to claim 1, wherein:
each of the objects is a piece of printed matter;
the portion which cannot be used for the production is, of a predetermined unit paper sheet, a portion where no printing image is formed; and
the processor is configured to change the order number of the objects when the portion where no printing image is formed increases or decreases due to a change in number of the pieces of printed matter.

3. The information processing apparatus according to claim 2, wherein:
the processor is configured to increase or reduce the order number of the objects so as to prevent generation of the portion where no printing image is formed.

4. The information processing apparatus according to claim 1, wherein:
the processor is configured to increase or reduce the order number of the objects so as to make the order number of the objects equal to a number closest to the order number, of numbers which are integer multiples of a predetermined number.

5. The information processing apparatus according to claim 4, wherein:
the processor is configured to increase or reduce the order number of the objects so as to make the order number of the objects equal to a number closest to the order number, of numbers which are integer multiples of predetermined different numbers.

6. The information processing apparatus according to claim 4, wherein:
   each of the objects is a piece of printed matter; and
   the predetermined number is a number of faces in each of which the piece of printed matter can be printed on a predetermined unit paper sheet.

7. The information processing apparatus according to claim 1, wherein:
   the processor is configured to increase or reduce the order number of the objects of each of a plurality of users so as to make a sum of the order numbers of the users equal to a number closest to the sum, of numbers which are integer multiples of a predetermined number.

8. The information processing apparatus according to claim 7, wherein:
   the processor is configured to increase or reduce the order number of the objects of each of the users so as to make the sum equal to a number closest to the sum, of numbers which are integer multiples of predetermined different numbers.

9. The information processing apparatus according to claim 1, wherein:
   each of the objects is a business card; and
   the processor is configured to:
      estimate a remaining number of the business cards of the user from a number of business cards of other persons obtained by business card exchange with the other persons and registered into the information processing apparatus by the user; and
      determine the order number of the user based on the estimated remaining number of the business cards of the user.

10. The information processing apparatus according to claim 2, wherein:
    each of the objects is a business card; and
    the processor is configured to:
       estimate a remaining number of the business cards of the user from a number of business cards of other persons obtained by business card exchange with the other persons and registered into the information processing apparatus by the user; and
       determine the order number of the user based on the estimated remaining number of the business cards of the user.

11. The information processing apparatus according to claim 3, wherein:
    each of the objects is a business card; and
    the processor is configured to:
       estimate a remaining number of the business cards of the user from a number of business cards of other persons obtained by business card exchange with the other persons and registered into the information processing apparatus by the user; and
       determine the order number of the user based on the estimated remaining number of the business cards of the user.

12. The information processing apparatus according to claim 4, wherein:
    each of the objects is a business card; and
    the processor is configured to:
       estimate a remaining number of the business cards of the user from a number of business cards of other persons obtained by business card exchange with the other persons and registered into the information processing apparatus by the user; and
       determine the order number of the user based on the estimated remaining number of the business cards of the user.

13. The information processing apparatus according to claim 5, wherein:
    each of the objects is a business card; and
    the processor is configured to:
       estimate a remaining number of the business cards of the user from a number of business cards of other persons obtained by business card exchange with the other persons and registered into the information processing apparatus by the user; and
       determine the order number of the user based on the estimated remaining number of the business cards of the user.

14. The information processing apparatus according to claim 9, wherein:
    the processor is configured to increase or reduce the determined order number of the user so as to make the determined order number of the user equal to a number closest to the determined order number of the user, of numbers which are integer multiples of a number with which the business cards can be produced from a printing paper sheet and which is the predetermined number, the printing paper sheet being the resource used for producing the business cards.

15. The information processing apparatus according to claim 10, wherein:
    the processor is configured to increase or reduce the determined order number of the user so as to make the determined order number of the user equal to a number closest to the determined order number of the user, of numbers which are integer multiples of a number with which the business cards can be produced from a printing paper sheet and which is the predetermined number, the printing paper sheet being the resource used for producing the business cards.

16. The information processing apparatus according to claim 11, wherein:
    the processor is configured to increase or reduce the determined order number of the user so as to make the determined order number of the user equal to a number closest to the determined order number of the user, of numbers which are integer multiples of a number with which the business cards can be produced from a printing paper sheet and which is the predetermined number, the printing paper sheet being the resource used for producing the business cards.

17. The information processing apparatus according to claim 12, wherein:
    the processor is configured to increase or reduce the determined order number of the user so as to make the determined order number of the user equal to a number closest to the determined order number of the user, of numbers which are integer multiples of a number with which the business cards can be produced from a printing paper sheet and which is the predetermined number, the printing paper sheet being the resource used for producing the business cards.

18. The information processing apparatus according to claim 13, wherein:
    the processor is configured to increase or reduce the determined order number of the user so as to make the determined order number of the user equal to a number closest to the determined order number of the user, of numbers which are integer multiples of a number with which the business cards can be produced from a printing paper sheet and which is the predetermined number, the printing paper sheet being the resource used for producing the business cards.

19. A non-transitory computer readable medium storing an information processing program causing a computer to execute a process for information processing, the process comprising:

calculating an order number of objects of a user if a number of the objects of the user is smaller than a predetermined number limit; and changing the order number of the objects so that, of a resource used for production of the objects, a portion which cannot be used for the production is not larger than a predetermined standard.

* * * * *